March 5, 1946.    W. A. G. BOX    2,396,078
PIPE COUPLING
Filed Dec. 29, 1942
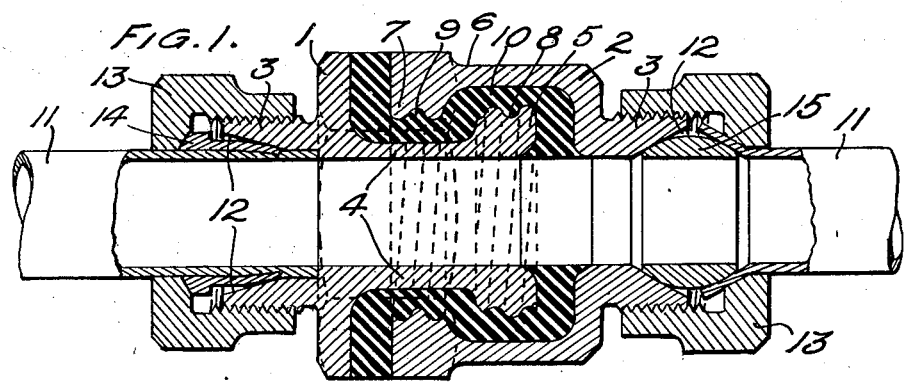
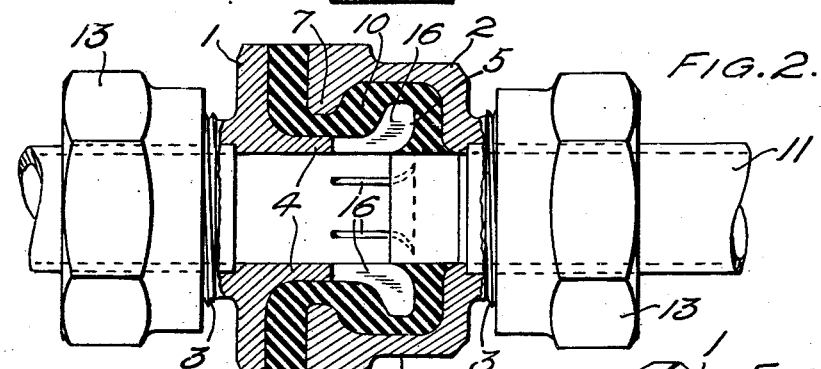
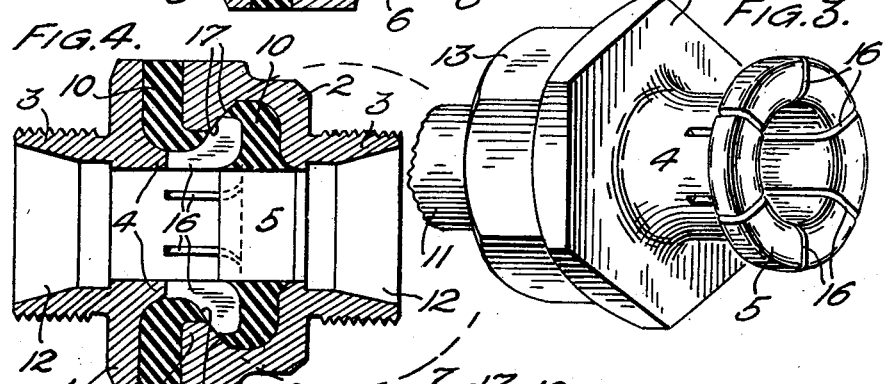
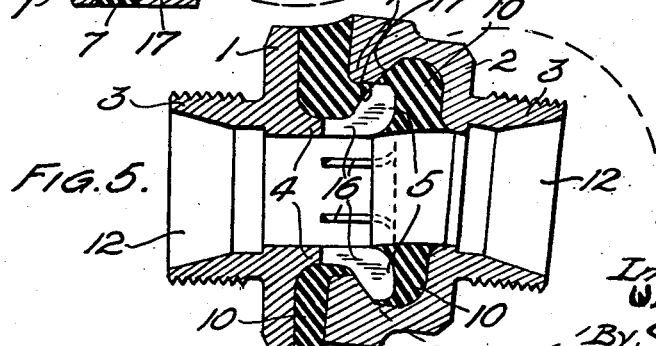
Inventor.
William Arthur George Box
By Peck & Peck
Attys Patented Mar. 5, 1946

2,396,078

UNITED STATES PATENT OFFICE 2,396,078

PIPE COUPLING

William Arthur George Box, Maidenhead, England

Application December 29, 1942, Serial No. 470,503
In Great Britain January 3, 1942

1 Claim. (Cl. 285—90)

This invention relates to pipe couplings, that is devices for connecting a pipe to another part having a through orifice. Said other part may be, for example, another pipe, a side or bottom of a tank, a partition in a tank or a bulkhead, or other unit. More particularly the coupling is of the kind which is in two axially displaced sections with an elastic tubular member therebetween bonded to the said sections.

The present invention has for one object to provide a flexible coupling which will have an improved resistance to extension forces.

The present invention is a pipe coupling comprising a first section having a tubular extension at one side with an inwardly projecting flange at its end, a second section having a tubular extension at one side of smaller external dimensions than the internal dimensions of the extension from the first section with an outwardly projecting flange at its end disposed within the extension from the first section and of such dimensions that it is overlapped by the inwardly projecting flange of the first section, an elastic material in the space between the sections and flanges and bonded thereto, and means to connect elements with through holes to the two sections.

According to a modification of the invention the extension from a section is constituted by a plurality of fingers with narrow spaces therebetween formed, for example by saw-cuts. The said spaces may extend for a portion only of the length of the tubular extension.

The inward and outward projections or flanges may have their edges threaded with co-operating threads and be of such diameter that the one may be screwed into and through the other.

According to a further feature of the invention when the extension from a section is constituted by a plurality of separated fingers the said fingers may be such that they can be deformed to permit them to be positioned in relation to the other tubular extension and then caused or allowed to take up a position in relation to said other extension so that the inward and outward projections or flanges overlap.

The tubular extension with its projection or flange which is to be deformed may be of a material which is sufficiently ductile to permit it to take a first permanent deformation to enable it to be positioned in relation to the other tubular extension and then to take a second permanent deformation to restore its original form and cause the projections or flanges of the two extensions to overlap. On the other hand in some couplings, particularly of smaller size the material employed may be springy.

With such an arrangement a greater overlap of the projections is possible than with the constructions in which the projections have their edges threaded and one is screwed into and through the other.

The projections are spaced apart by the elastic or resilient material.

When a coupling is employed in a pipe line carrying fluid at considerable pressure the parts of the coupling are submitted to forces which tend to force them axially apart. The result is that there is a tendency, due to the compressibility of the elastic or resilient material, for the two parts of the coupling actually to move so that the coupling increases in length. This causes various difficulties and it is also an object of the present invention to provide a construction of coupling by which such disadvantages may be overcome.

According to a modification of the invention the overlapping outward and inward projections or flanges have their adjacent faces in contact. Thus the coupling cannot be elongated when submitted to the forces due to fluid passing through it at high pressure.

Preferably one contacting surface is a part of the surface of a sphere or both contacting surfaces are parts of the surface of a sphere. This permits the two sections of the coupling to become relatively angularly displaced without unduly straining the elastic or resilient material.

The invention is particularly applicable to couplings of the kind in which a first coupling member has a second member secured to it, as by a threaded connection to secure a pipe thereto. On the other hand it may be of the kind in which the pipe to be connected has its end threaded and the coupling member is screwed on to it.

Forms of pipe coupling according to the present invention for coupling together two pipes will now be described by way of example and with reference to the accompanying drawing, wherein—

Fig. 1 shows in section one form of pipe coupling with two methods of securing a pipe thereto, Fig. 2 shows a modified form of the coupling illustrated in Fig. 1, Fig. 3 shows in perspective a part of the coupling illustrated in Fig. 2, and Figs. 4 and 5 show a second modified form of coupling.

Like references indicate like parts in the drawing.

Referring first to Fig. 1 the coupling member illustrated comprises two axially displaced sections 1, 2 each having a threaded tubular extension 3 from its outer face. The section 1 has a tubular extension from its inner face which forms the internal passage of the coupling and it is constituted by a cylindrical wall 4 having an outward projection in the form of a flange 5 at its end. The other section 2 has a tubular extension from its inner face comprising a cylindrical wall 6 of larger diameter than the flange 5 of the section 1 and surrounding it and with an inwardly directed projection or flange 7 at its end. The outer edge of the flange 5 and the inner edge of the flange 7 are provided with co-operating screw threads 8, 9 and they are of such diameter that the one may be screwed into and through the other to assume a position illustrated in the drawing.

When the two parts have been placed together and the threaded flange 5 screwed into and through the threaded flange 7 a substantially parallel channel 10 is formed between the adjacent faces of the two sections which channel in section is of substantially S-shape. Rubber or synthetic rubber is injected into the channel and is submitted to a fusing action whereby it becomes bonded to the faces of the two sections of the coupling member.

The two flanges 5 and 7 overlap each other by an amount equal to the depth of the threads 8, 9 whereby an improved resistance to extension forces on the coupling is obtained.

Two methods of securing a pipe to the coupling member are illustrated in Fig. 1. Reference will be made first to the arrangement at the left-hand side of Fig. 1. The pipe is indicated at 11. The section 1 of the coupling has a conical mouth 12. A second internally threaded nut member 13 co-operates with the threaded extension 3 to secure the pipe 11 to the section 1 when it is screwed on to the threaded extension 3. A packing ring 14 surrounds the pipe and when the member 13 is coupled to the threaded extension 3, is moved along the pipe into the conical mouth 12 and is deformed to grip the pipe. The ring 14 may be of the kind which when deformed bites into the pipe.

In the arrangement illustrated at the right-hand side of Fig. 1, instead of a packing ring surrounding the pipe 11, a packing member (usually termed an olive) 15 extends at one end into the conical mouth 12 of the threaded extension 3 and at the other end into the open end of the pipe. The second threaded nut coupling member 13 receives the pipe 11 and acts to compress its end on to the packing member or olive 15 and the latter into the conical mouth 12.

A flexible coupling according to the present invention is particularly useful with means for coupling a pipe thereto as illustrated at the opposite ends of Fig. 1 of the drawing.

In the form of pipe coupling illustrated in Fig. 2 the cylindrical wall 4 with its flange 5 is slotted for a portion of its length at, for example, six equally spaced points with narrow slots or saw cuts 16 as more clearly seen in Fig. 3.

The edges of the flanges 5, 7 are not threaded and their diameters are such that when in position they overlap. The material from which the section with the outwardly directed flange 5 is formed is sufficiently ductile, for example it is of mild steel, to permit it to take a first permanent deformation. This is effected by driving the flange into a conical hole in a metal block. The slots 16 thus close and the diameter of the flange 5 is reduced sufficiently to permit it to be passed through the flange 7 of the other part. A mandrel is then driven into it to restore its original form.

When the two parts have thus been placed together a substantially parallel channel 10 is formed between the adjacent faces of the two extensions which in section is of substantially S-shape. Rubber or synthetic rubber is then injected into the said channel and is submitted to a fusing action whereby it becomes bonded to the faces of the two sections of the coupling member. The rubber enters and fills the slots 16 thus producing an improved holding. It also prevents the closing in of the parts which would permit two sections to separate if submitted to excessive pressures.

In the form of the invention illustrated in Figs. 4 and 5 the adjacent faces 17 of the flanges 5 and 7 of the two tubular extensions 4 and 6 comprise sections of the surface of a sphere and they are placed in contact. Otherwise the construction is as in Figure 2.

Should one part of the coupling be forced to take up a position at an angle to the other part as illustrated, for example in Fig. 5, the interengaging surfaces 17 of the two flanges or projections will ride smoothly one over the other and the rubber will not be unduly strained. The cylindrical wall 4 is shown slotted as in Figure 2 and it will be understood that it may be continuous as in Fig. 1, and the flanges or projections 5, 7 may be introduced the one into the other by co-operating screw threads.

The elastic or resilient material is usually rubber or synthetic rubber but in some circumstances other plastic and resilient materials may be employed which can be bonded to the parts of the coupling. A synthetic rubber is particularly useful when petrol, oil or fluids at high temperature may be in contact with it.

It has so far been considered preferable for the inner tubular extension to be slotted though it will be understood the outer tubular extension or the extensions from both sections may be slotted.

What I claim is:

A pipe coupling comprising a first section having a tubular extension at one side with an inwardly projecting flange at its end and a screw thread on the edge of the flange, a second section having a tubular extension at one side of smaller external dimensions than the internal dimensions of the extension from the first section with an outwardly projecting flange at its end disposed within the extension from the first section and of such dimensions that it is overlapped by the inwardly projecting flange of the first section and a screw thread on the edge of said flange to co-operate with the screw thread on the flange of the first section so that the one flange may be screwed into and through the other, an elastic material in the space between the sections and flanges and bonded thereto, and means to connect elements with through holes to the two sections.

WILLIAM ARTHUR GEORGE BOX.